(12) United States Patent
Smith et al.

(10) Patent No.: US 12,129,051 B2
(45) Date of Patent: Oct. 29, 2024

(54) MODEL PREDICTIVE CONTROL FOR SPACECRAFT FORMATION

(71) Applicant: Utah State University Space Dynamics Laboratory, North Logan, UT (US)

(72) Inventors: Tyson Smith, Logan, UT (US); John Akagi, Logan, UT (US); Greg Droge, Nibley, UT (US)

(73) Assignee: Utah State Unviersity Space Dynamics Laboratory, North Logan, UT (US)

( * ) Notice: Subject to any disclaimer, the term of this patent is extended or adjusted under 35 U.S.C. 154(b) by 440 days.

(21) Appl. No.: 17/689,038

(22) Filed: Mar. 8, 2022

(65) Prior Publication Data
US 2023/0286673 A1   Sep. 14, 2023

(51) Int. Cl.
*B64G 1/24* (2006.01)
*G05B 13/04* (2006.01)

(52) U.S. Cl.
CPC ........... *B64G 1/242* (2013.01); *G05B 13/042* (2013.01); *B64G 1/247* (2023.08)

(58) Field of Classification Search
CPC ....... B64G 1/242; B64G 1/247; G05B 13/042
See application file for complete search history.

(56) References Cited

U.S. PATENT DOCUMENTS

| | | | |
|---|---|---|---|
| 2017/0247123 A1 | 8/2017 | Turner | |
| 2018/0233054 A1 | 8/2018 | Woon et al. | |
| 2019/0049999 A1 | 2/2019 | Weiss et al. | |
| 2020/0055617 A1* | 2/2020 | Grover | G06F 17/13 |
| 2022/0063842 A1 | 3/2022 | Weiss et al. | |
| 2022/0363415 A1 | 11/2022 | Conn | |

OTHER PUBLICATIONS

Design and optimization of low thrust orbital phasing maneuver (2015) (Year: 2015).*
Non-linear Earth orbit control using low thrust propulsion (2021), (Year: 2021).*
"Office Action Summary", USPTO, Jul. 25, 2024, pp. 1-48.

* cited by examiner

*Primary Examiner* — Ian Jen
*Assistant Examiner* — Renee LaRose
(74) *Attorney, Agent, or Firm* — Kunzler Bean & Adamson; Scott D. Thorpe

(57) ABSTRACT

For model predictive control for a spacecraft formation, a method calculates a virtual point that represents a plurality of spacecraft orbiting in a spacecraft formation. The method calculates an outer polytope boundary and an inner polytope boundary relative to the virtual point for a given spacecraft of the plurality of spacecraft. The method maneuvers the given spacecraft to within the inner polytope boundary using model predictive control (MPC) to minimize fuel consumption.

20 Claims, 11 Drawing Sheets

201

| Spacecraft State 203 |
| --- |
| Distance Threshold 205 |
| Outer Polytope Boundary 207 |
| Inner Polytope Boundary 209 |
| Matrix Constraint 211 |
| First Objective Function 213a |
| Second Objective Function 213b |
| Third Objective Function 213c |
| Maneuver Strategy 215 |
| Velocity Change 217 |
| Model Predictive Controller 219 |
| Orbital Data 221 |
| Switching Strategy 223 |
| Drift Horizon 225 |

MODEL PREDICTIVE CONTROL FOR SPACECRAFT FORMATION

FIELD

The subject matter disclosed herein relates to model predictive control (MPC) and more particularly relates to MPC for a spacecraft formation.

BACKGROUND

Description of the Related Art

Spacecraft maneuver within a spacecraft formation to achieve a mission objective.

BRIEF SUMMARY

A method for model predictive control for a spacecraft formation is disclosed. The method calculates a virtual point that represents a plurality of spacecraft orbiting in a spacecraft formation. The method calculates an outer polytope boundary and an inner polytope boundary relative to the virtual point for a given spacecraft of the plurality of spacecraft. The method maneuvers the given spacecraft to within the inner polytope boundary using model predictive control (MPC) to minimize fuel consumption. An apparatus and computer program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
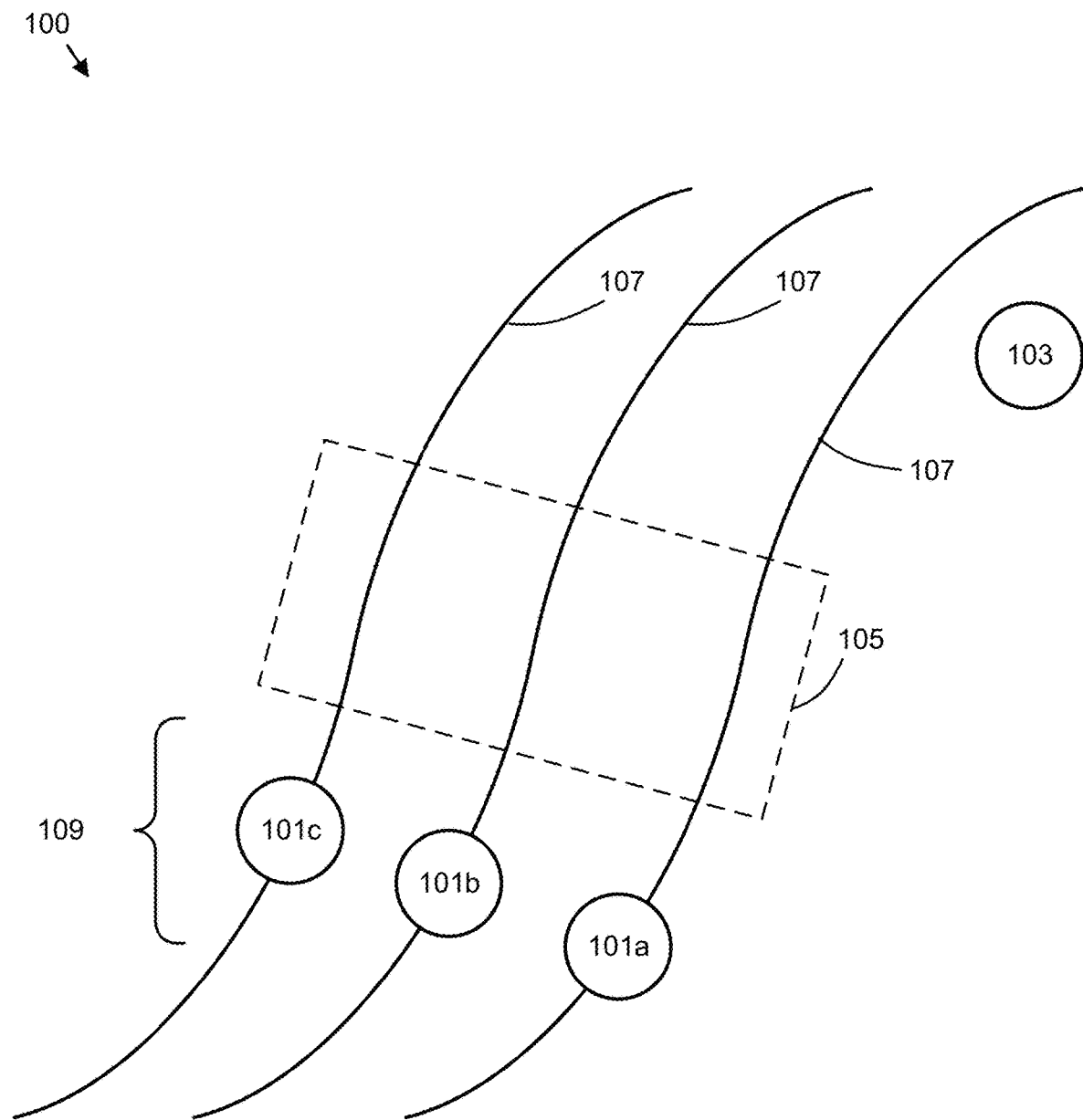
FIG. 1A is a schematic diagram illustrating one embodiment of a spacecraft constellation.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object-oriented programming language such as Python, Ruby, R, Java, Java Script, Smalltalk, C++, C sharp, Lisp, Clojure, PHP, MATLAB, or the like and conventional procedural programming languages, such as the "C" programming language or similar programming languages. The computer readable code may execute entirely on a spacecraft or ground station computer, partly on the spacecraft or ground station computer, as a stand-alone software package, partly on the spacecraft computer and partly on a ground station computer or entirely on the ground station remote computer or server. In the latter scenario, the remote computer may be connected to the spacecraft computer through any type of network.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

The description of elements in each figure may refer to elements of proceeding figures. Like numbers refer to like elements in all figures, including alternate embodiments of like elements.

FIG. 1A is a schematic diagram illustrating one embodiment of a spacecraft constellation 100. In the depicted embodiment, a plurality of spacecraft 101 are shown traversing orbital tracks 107. The spacecraft 101 may be orbiting in a spacecraft formation 109 to perform a mission objective such as capturing data in a target area 105. Capturing data may include but is not limited to gravitational mapping, capturing images, capturing sensor data, making measurements, communicating with ground stations 103 on the ground, communicating with another spacecraft 101, and the like.

A spacecraft 101 may need to maneuver to avoid debris or perform a mission objective. Maneuvers are complicated by a need to maintain formation. In addition, maneuvers are constrained by a need to reduce fuel consumption. Unfortunately, both communication bandwidth to the spacecraft 101 and/or on spacecraft computing resources may be limited. As a result, the spacecraft 101 may need to calculate maneuvers with restricted computing resources. In addition, a ground station 103 may need to calculate maneuvers for many spacecraft 101 concurrently.

The embodiments described herein employ model predictive control (MPC) with polytope boundaries to maintain the trajectories of a formation. The embodiments simplify the calculations so that a spacecraft 101 may perform the calculations autonomously. In addition, the embodiments speed the calculations for maneuvers at the ground station 103. As a result, the efficiency of a computer controlling the spacecraft 101 is improved.

Figure 1B:
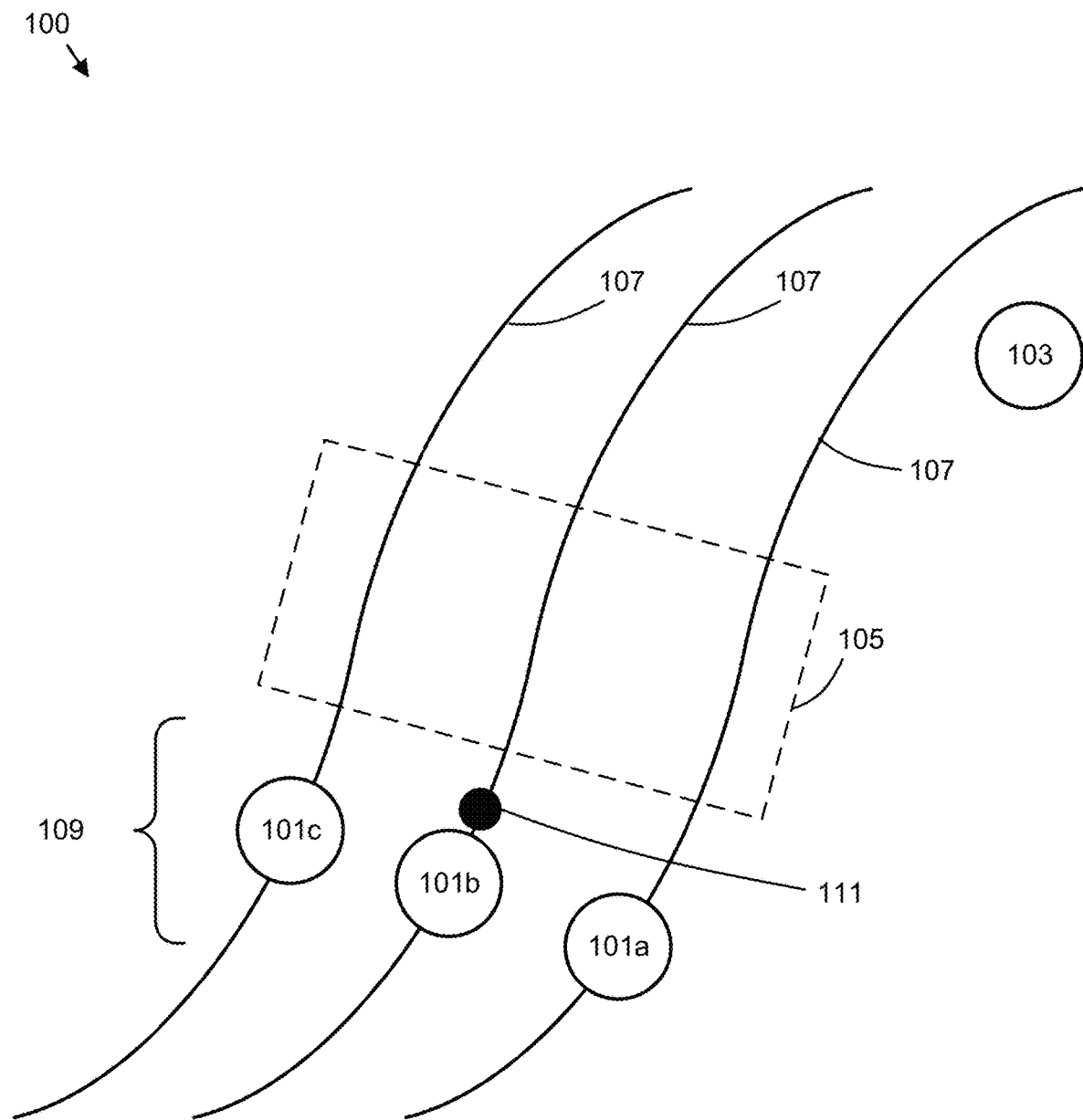
FIG. 1B is a schematic diagram illustrating one alternate embodiment of a spacecraft constellation.

FIG. 1B is a schematic diagram illustrating one alternate embodiment of the spacecraft constellation 100. In the depicted embodiment, a virtual point 111 is shown for the spacecraft formation 109. The virtual point 111 may be used to design a reference orbit for each spacecraft 101 in the spacecraft formation 109. There is no physical spacecraft 101 associated with the virtual point 111. The virtual point 109 represents a fictitious spacecraft 101 where motion is propagated through time according to a standard nonlinear motion model. From the virtual point 111, relative orbital tracks 107 may be generated that define the nominal locations of each of the spacecraft 101 within the spacecraft formation 109. The virtual point 111 may represent the spacecraft formation 109 to each spacecraft 101, simplifying control calculations. In the depicted embodiment, the virtual point 111 leads the spacecraft formation 109.

Figure 1C:
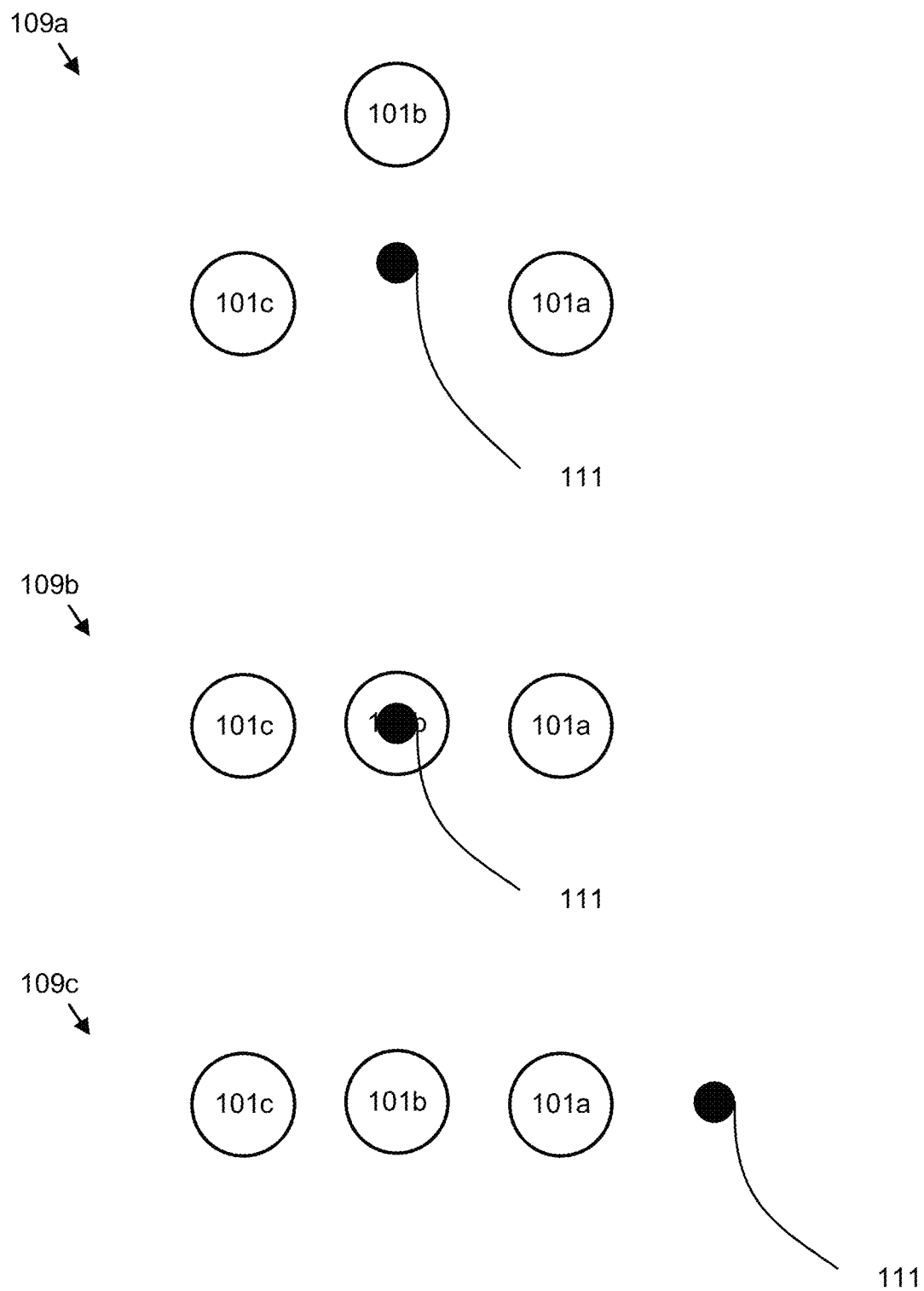
FIG. 1C is a schematic diagram illustrating one embodiment of virtual points.

FIG. 1C is a schematic diagram illustrating one embodiment of virtual points 111 in spacecraft formations 109a-c. The virtual point 111 may be at a center of a spacecraft formation 109 as shown for spacecraft formations 109a/b. The virtual point 111 may be offset from the center including outside the spacecraft formation 109 as shown in spacecraft formation 109c.

Figure 2A:
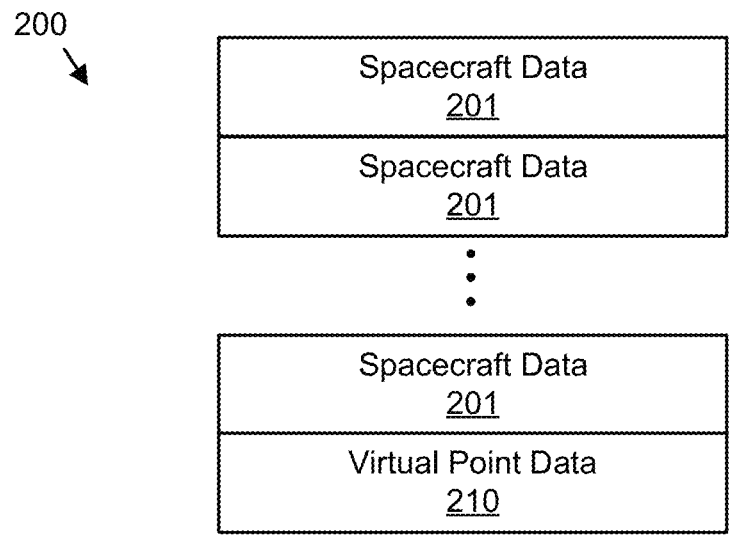
FIG. 2A is a schematic block diagram illustrating one embodiment of formation data.

FIG. 2A is a schematic block diagram illustrating one embodiment of formation data 200. The formation data 200 describes the orbital track 107 of the spacecraft 101 in the spacecraft formation 109. The formation data 200 may be organized as a data structure in a memory. The formation data 200 includes spacecraft data 201 for each spacecraft 101 in the spacecraft formation 109. The spacecraft data 201 is described in more detail in FIG. 2C. In addition, the formation data 200 includes virtual data 210 that describes the orbital track 107 of the virtual point 111.

Figure 2B:
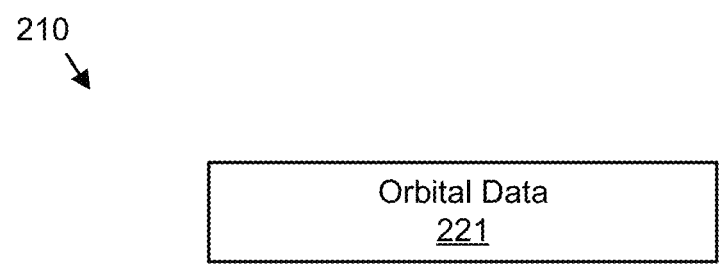
FIG. 2B is a schematic block diagram illustrating one embodiment of virtual point data.

FIG. 2B is a schematic block diagram illustrating one embodiment of the virtual point data 210. In the depicted embodiment, the virtual point data 210 includes orbital data 221. The orbital data 221 may be expressed as Relative Orbital Elements (ROE) and/or Local Vertical Local Horizontal (LVLH) data.

In one embodiment, the orbital data 221 is described using Hill-Chohessey-Whiltshire (HCW) equations as shown in Equation 1. The HCW equations linearize the two-body gravitational dynamic equations about a circular orbit and can be stated as $$\ddot{x} - 3n_c^2 x - 2n_c \dot{y} = u_x$$

$$\ddot{y} + 2n_c \dot{x} = u_y$$

$$\ddot{z} + n_c^2 z = u_z \qquad (1)$$

where x, y, and z represent the relative position of the spacecraft 101 in Cartesian coordinates in the Local Vertical, Local Horizontal (LVLH) frame; $\dot{x}$, $\dot{y}$ and $\dot{z}$ represent the relative velocities; $\ddot{x}$, $\ddot{y}$ and $\ddot{z}$ represent the relative accelerations; and $n_c$ is the mean motion, or average angular velocity, of the orbital data 221. The LVLH frame may be defined such that x is the radial direction, z is along the angular momentum vector, and y satisfies the right-hand rule.

If the spacecraft state of the virtual point 111 or spacecraft 101 is defined as $x=[x\ y\ z\ \dot{x}\ \dot{y}\ \dot{z}]^T$ and the control as $u=[u_x u_y u_z]T$, Equation 1 can be written in the state space form as shown in Equation 2.

$$x = Ax + Bu \qquad (2)$$

where $$A = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 3n_c^2 & 0 & 0 & 0 & 2n_c & 0 \\ 0 & 0 & 0 & -2n_c & 0 & 0 \\ 0 & 0 & -n_c^2 & 0 & 0 & 0 \end{bmatrix} B = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \qquad (3)$$

If A and B are held constant over some timestep $\Delta t$, an exact discrete solution can be found as shown in Equation 4.

$$x_{k+1} A_D x_k + B_D u_k, A_D = e^{A\Delta t}, B_D = (\int_0^{\Delta t} e^{A(\Delta t - \tau)} d\tau) B \qquad (4)$$

The resulting discretized HCW matrices are shown in Equations 5 and 6.

$$A_D = \begin{bmatrix} 4-3\cos n_c\Delta t & 0 & 0 & \frac{1}{n_c}\sin n_c\Delta t & \frac{2}{n}(1-\cos n_c\Delta t) & 0 \\ 6(\sin n_c\Delta t - n_c\Delta t) & 1 & 0 & \frac{2}{n}(\cos n_c\Delta t - 1) & \frac{1}{n}(4\sin n_c\Delta t - 3n_c\Delta t) & 0 \\ 0 & 0 & \cos n_c\Delta t & 0 & 0 & \frac{1}{n}\sin n_c\Delta t \\ 3n_c\sin n_c\Delta t & 0 & 0 & \cos n_c\Delta t & 2\sin n_c\Delta t & 0 \\ 6n_c(\cos n_c\Delta t - 1) & 0 & 0 & -2\sin n_c\Delta t & 4\cos n_c\Delta t - 3 & 0 \\ 0 & 0 & -n_c\sin n_c\Delta t & 0 & 0 & \cos n_c\Delta t \end{bmatrix} \quad (5)$$

$$B_D = \begin{bmatrix} \frac{2}{n_c^2}\sin^2\frac{n_c\Delta t}{2} & -\frac{2}{n_c^2}(\sin n_c\Delta t - n_c\Delta t) & 0 \\ \frac{2}{n_c^2}(\sin n_c\Delta t - n_c\Delta t) & -\frac{1}{2n_c^2}(8\cos n_c\Delta t + 3n_c^2\Delta t^2 - 8) & 0 \\ 0 & 0 & \frac{2}{n_c^2}\sin^2\frac{n_c\Delta t}{2} \\ \frac{1}{n_c}\sin n_c\Delta t & -\frac{1}{n_c}(2\cos n_c\Delta t - 2) & 0 \\ -\frac{4}{n_c}\sin^2\frac{n_c\Delta t}{2} & \frac{4}{n_c}\sin n_c\Delta t - 3\Delta t & 0 \\ 0 & 0 & \frac{1}{n_c}\sin n_c\Delta t \end{bmatrix} \quad (6)$$

In one embodiment, $A_D$ matches the discrete transition matrix in Equation 2 while $B_D$ is derived using Equations 3 and 4.

Figure 2C:
FIG. 2C is a schematic block diagram illustrating one embodiment of spacecraft data.

FIG. 2C is a schematic block diagram illustrating one embodiment of the spacecraft data 201. In the depicted embodiment, the spacecraft data 201 includes the spacecraft state 203, a distance threshold 205, an outer polytope boundary 207, an inner polytope boundary 209, a matrix constraint 211, at least one objective function 213, a maneuver strategy 215, a velocity change 217, the MPC 219, the orbital data 221 for the spacecraft 101, a switching strategy 223, and a drift horizon 225.

The distance threshold 205 may specify a maximum distance that a given spacecraft 101 may move within the spacecraft formation 109 relative to the virtual point 111. The distance threshold 205 may be a constant. Alternatively, the distance threshold 205 may be dynamically calculated. The distance threshold 205 may be a vector.

The MPC 219 is used to find the most fuel-efficient strategy to perform an in-space maneuver for the spacecraft 101. The basis for these dynamic optimization problems is a dynamic model that describes how the spacecraft state x(k) 203 changes with time, assuming an initial condition x(0), that is affected by the control input u(k) as shown in Equation 7.

$$x(k+1)=g(x(k),u(k)), x(0)=x_0, \quad (7)$$

where g(x, u) generally represents a nonlinear function. The goal of the optimal control procedure is to find the vector of inputs $U_N=[u(0)^T, \ldots, u(N-1)^T]^T$ such that the objective function is optimized over the time horizon N. The MPC 219 may be solved as shown in Equation 8.

$$\min_{U_N} \sum_{k=0}^{N-1} q(x_k, u_k) + p(x_N) \quad (8)$$
$$\text{s.t.} \quad x_{k+1} = g(x(k), u(k)), \quad x(0) = x_0 \quad k = 1, 2, , N$$
$$u_k \in U, x_k \in X \quad k = 0, 1, 2, , N-1$$

The terms q(x, u) and p(x) represent the stage cost and the terminal cost, respectively. Stage cost is the transitory cost along the maneuver. Terminal cost is a cost for the final maneuver. In the past, two problems often occurred when using an optimal control solution in practice. First, even with optimization algorithms taking advantage of linearities and convexities, a horizon time that is sufficiently large enough to produce desirable convergence characteristics may prove computationally prohibitive. Second, the model of the spacecraft 101 is usually inaccurate and the spacecraft 101 may be impacted by external disturbances that can cause it to diverge from the predicted path. For this reason, in the embodiments, the spacecraft state 203 may be measured at a future time period and the optimal control problem is resolved, where the measured spacecraft state x(1) 203 is considered the new initial condition. This process is embodied in the MPC 219.

The MPC 219 provides the ability to express constraints, which is not common in many feedback control solutions. Furthermore, weights in the objective functions 213 can provide intuitive "control knobs" for tuning to the desired behavior.

Common objective functions 213 for linear systems include the $L_2$, $L_1$, and $L_\infty$ norms as they can result in quadratic and linear programs. Given an initial spacecraft state of $x_0$ 203, and a time horizon of N intervals, the $L_2$, or quadratic, objective function 213b can be written as shown in Equation 9.

$$J(x, u) = \frac{1}{2}u_0^T R u_0 + \frac{1}{2}\sum_{k=1}^{N-1}\left[x_k^T Q x_k + u_k^T R u_k\right] + \frac{1}{2}x_N^T P x_N \quad (9)$$

where R, Q, and P are the weightings on control usage, state error, and terminal error, respectively. For a linear system, the spacecraft dynamics become $x_{k+1}=Ax_k+Bu_k$. The $L_1$ and $L_\infty$ objective functions 213 are shown in Equations 10 and 11 respectively.

$$J_1=\Sigma_{k=1}^{N-1}|Qx_k|_1+\Sigma_{k=0}^{N-1}|Ru_k|_1+|Px_N|_1 \quad (10)$$

$$J_\infty=\Sigma_{k=1}^{N-1}|Qx_k|_\infty+\Sigma_{k=0}^{N-1}|Ru_k|_\infty+|Px_N|_\infty. \quad (11)$$

To maintain a given spacecraft formation 109, the outer polytope boundary 207 and the inner polytope boundary 209 are defined to force the spacecraft 101 to stay within a designated volume. This allows the spacecraft 101 to drift while also maintaining the given spacecraft 101 in the required position within the spacecraft formation 109. At each timestep k the outer polytope boundary 207 and the inner polytope boundary 209 are defined by a convex polytope consisting of M faces where the position elements of the desired spacecraft state $x_{d,k}$ 203 of the spacecraft 101 exist within the volume. M may be in the range of 6 to 15. In addition, M may be in the range of 16 to 64. In one embodiment, M is in the range of 65 to 1024. Reducing M may improve the efficiency of calculations. The use of a convex polytope allows for a high degree of freedom in the possible constraints and for the formulation of the problem as a linear program. Each of the M planes are defined by a point p and a normal vector $\hat{\eta}$ that is assumed to point towards the interior of the outer polytope boundary 207 and/or the inner polytope boundary 209. Let r be any arbitrary point. If r is on the boarder or interior of the outer polytope boundary 207 and/or the inner polytope boundary 209 then the dot product will satisfy Equation 13.

$$\hat{\eta} \cdot (r-p) \geq 0 \text{ or, equivalently, } -\hat{\eta}^T r \leq -\hat{\eta}^T p. \tag{13}$$

The matrix constraint 211 may be used to force the spacecraft state $x_k$, 203 consisting of three position and three velocity elements, to be within the outer polytope boundary 207 and/or the inner polytope boundary 209 defined at time k. This is formulated as Equation 14 and 15.

$$A_{poly,k} x_k \leq b_{poly,k} \tag{14}$$

where $$A_{poly,k} = \begin{bmatrix} -\hat{\eta}_{1,k}^T & 0_{1\times 3} \\ -\hat{\eta}_{2,k}^T & 0_{1\times 3} \\ \vdots & \vdots \\ -\hat{\eta}_{M,k}^T & 0_{1\times 3} \end{bmatrix} b_{poly,k} = \begin{bmatrix} -\hat{\eta}_{1,k}^T p_{1,k} \\ -\hat{\eta}_{2,k}^T p_{2,k} \\ \vdots \\ -\hat{\eta}_{M,k}^T p_{M,k} \end{bmatrix} \tag{15}$$

with $\hat{\eta}_{i,k}$ and $p_{i,k}$ being the normal and point associated with the ith face of the polytope at time k. Note this implements a zero-padded version of Equation 13 which allows the constraint to ignore the velocity.

The outer polytope boundary 207 and the inner polytope boundary 209 may be a close approximation of a sphere although other constraints, such as the six-sided error box constraint, could also be accommodated. A spherical polytope approximation may be done by selecting points from a spherical surface and using those for the vertices of the polytope. The convex hull formed by these points is then found and each face is used as a polytope face. At each simulation step, the polytope 207/209 is formed by adding the points $p_{i,k}$ to each position along the desired trajectory of the spacecraft 101.

Velocity change (ΔV) 217 may be used as the metric to compare the fuel savings of the different norms. The three different object function norms 213 may be compared in terms of requisite computation time and total velocity change ΔV 217.

The embodiments implement the MPC 219 to calculate the optimal control sequence for the case when the spacecraft 101 exits a polytope boundary 207/209. As used herein, exits refers to reaches, exits, and/or will exit polytope boundary 207/209 within a specified time interval. The embodiments implement $L_1$, $L_2$, and $L_\infty$ norm objective functions 213 with the goal of comparing the fuel savings.

If it is desired that the spacecraft state x 203, tracks a desired trajectory, $x_d$, then the error state $x_e = x - x_d$ is driven to zero, and the objective function 213 may be updated to account for this. In one embodiment, the desired trajectory is the desired relative state 203 of each spacecraft 101 and is initialized using ROE and converted to the LVLH frame. The desired spacecraft state 203 for each spacecraft 101 is updated using the HCW equations.

Using the desired state, the $L_2$ objective function 213b can be written as Equation 16.

$$J(x, u) = \frac{1}{2} u_0^T R u_0 + \frac{1}{2} \sum_{k=1}^{N-1} \left[ x_{e,k}^T Q x_{e,k} - 2 x_{d,k}^T Q x_{e,k} + u_k^T R u_k \right] + \frac{1}{2} x_{e,N}^T P x_{e,N}. \tag{16}$$

The optimization problem with the polytope constraint can be written as Equation 17.

$$\min_{x,u} \quad \frac{1}{2} u_0^T R u_0 + \frac{1}{2} \sum_{k=1}^{N-1} \left[ x_k^T Q x_{e,k} - 2 x_{d,k}^T Q x_{e,k} + u_k^T R u_k \right] + \frac{1}{2} \left( x_{e,N}^T P x_{e,N} - 2 x_{d,N}^T P x_{e,N} \right)$$

$$\text{s.t.} \quad x_{k+1} = A_D x_k + B_D u_k \qquad k = 0, 1, , N-1$$
$$A_{poly,k} x_k \leq b_{poly,k} \qquad k = 1, 2, , N$$
$$u_k \leq 1 u_{max} \qquad k = 0, 1, 2, , N-1$$
$$u_k \geq -1 u_{max} \qquad k = 0, 1, 2, , N-1$$

The constraints ensure the dynamics are followed, keep the spacecraft 101 within the outer polytope boundary 207 and/or inner polytope boundary 209, and limit the maximum and minimum control accelerations.

The $L_1$ objective function 213a with $x_e$ may be Equation 18.

$$J_1 = \Sigma_{k=1}^{N-1} |Q x_{e,k}|_1 + \Sigma_{k=0}^{N-1} |R u_k|_1 + |P x_{e,N}|_1. \tag{18}$$

The full optimization formulation with the polytope constraint for the $L_1$ objective function 213b may then given by Equation 19.

$$\min_{x,u} \quad \sum_{k=1}^{N-1} |Q x_{e,k}|_1 + \sum_{k=0}^{N-1} |R u_k|_1 + |P x_{e,N}|_1 \tag{19}$$

$$\text{s.t.} \quad x_{k+1} = A_D x_k + B_D u_k \qquad k = 0, 1, , N-1$$
$$A_{poly,k} x_k \leq b_{poly,k} \qquad k = 1, 2, , N$$
$$u_k \leq 1 u_{max} \qquad k = 0, 1, 2, , N-1$$
$$u_k \geq -1 u_{max} \qquad k = 0, 1, 2, , N-1$$

The $L_\infty$ norm objective function 213c with $x_e$ may be written as Equation 20.

$$J_\infty = \Sigma_{k=1}^{N-1} |Q x_{e,k}|_\infty + \Sigma_{k=0}^{N-1} |R u_k|_\infty + |P x_{e,N}|_\infty. \tag{20}$$

The full optimization formulation with the polytope constraint for the $L_\infty$ objective function norm 213c is then Equation 21.

$$\min_{x,u} \quad \sum_{k=1}^{N-1} |Q x_{e,k}|_\infty + \sum_{k=0}^{N-1} |R u_k|_\infty + |P x_{e,N}|_\infty \tag{21}$$

-continued $$\text{s.t.} \quad x_{k+1} = A_D x_k + B_D u_k \quad k = 0, 1, , N-1$$
$$A_{poly,k} x_k \le b_{poly,k} \quad k = 1, 2, , N$$
$$u_k \le 1 u_{max} \quad k = 0, 1, 2, , N-1$$
$$u_k \ge -1 u_{max} \quad k = 0, 1, 2, , N-1$$

Figure 3A:
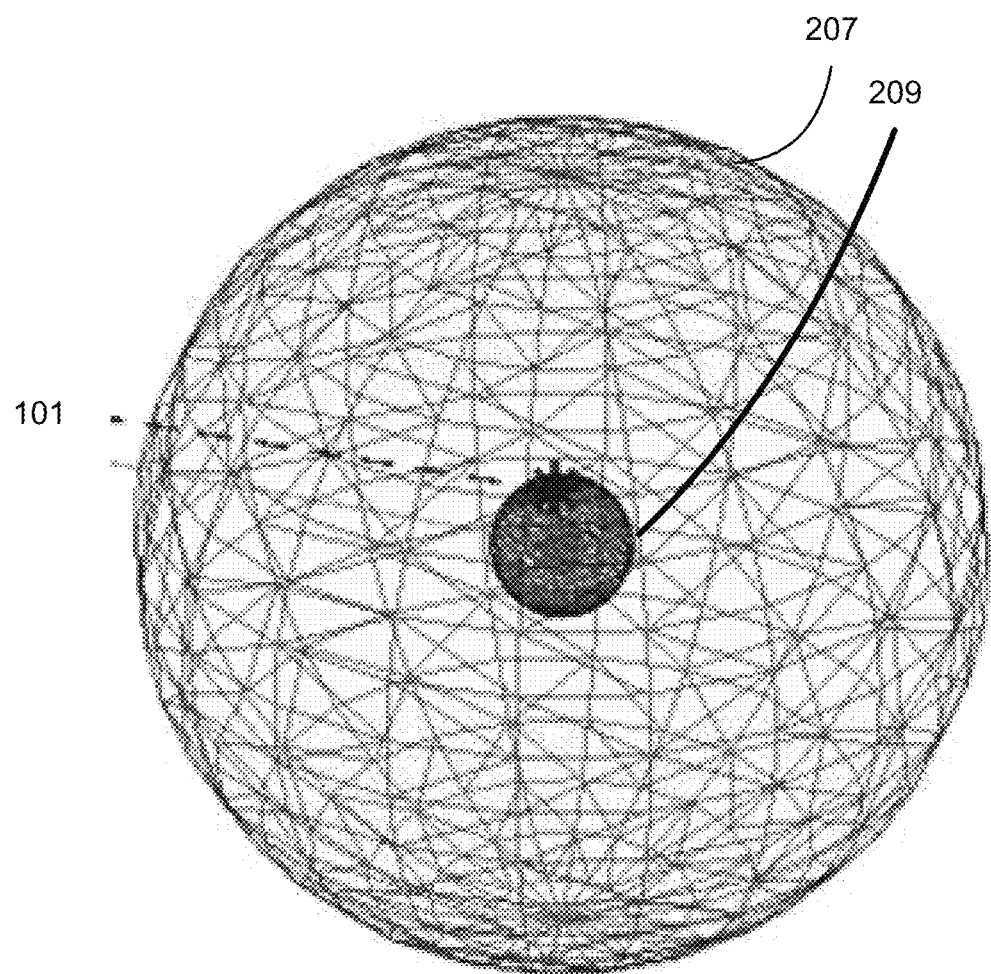
FIG. 3A is a drawing illustrating one embodiment of outer and inner polytope boundaries.
Figure 3B:
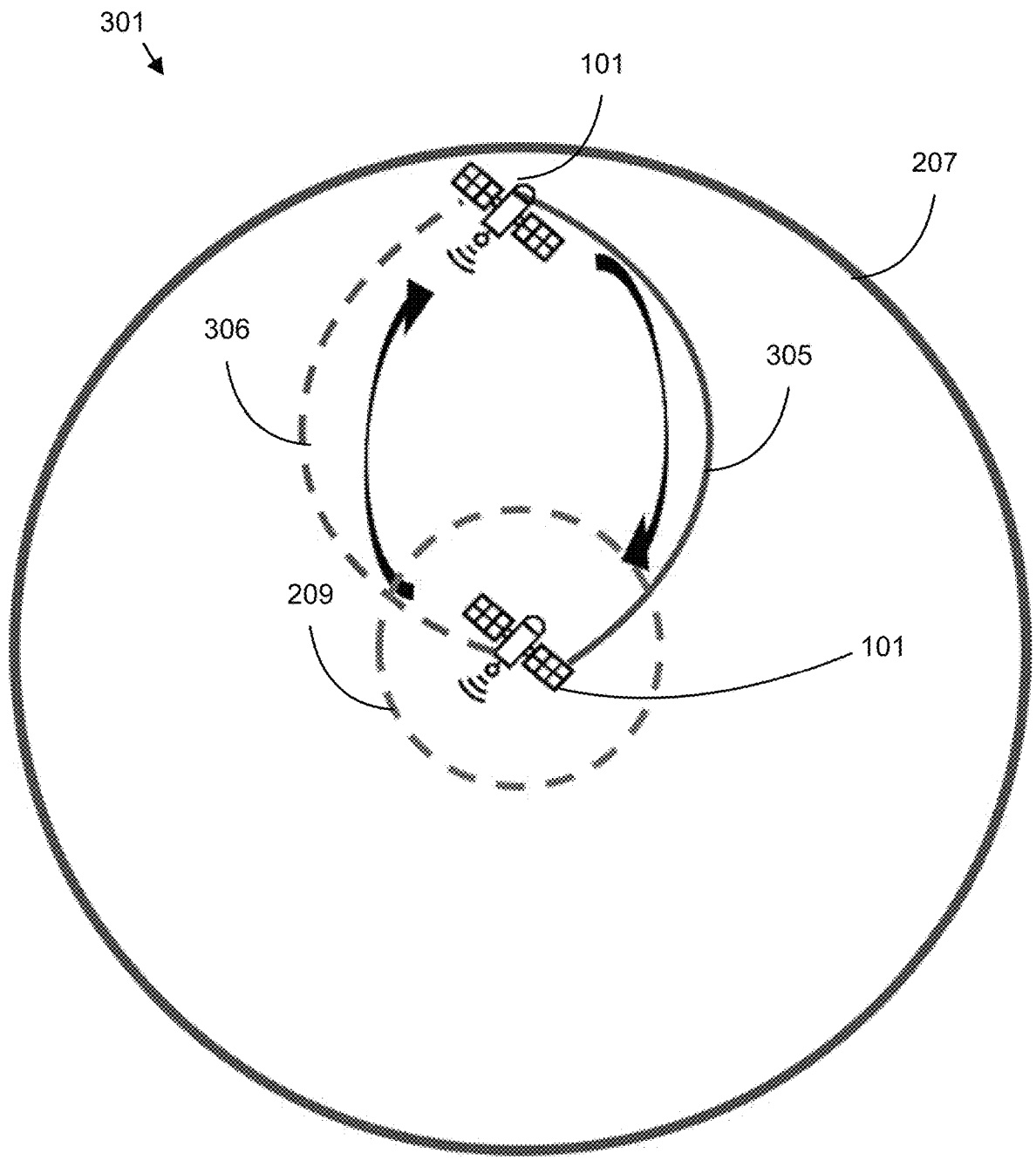
FIG. 3B is a drawing illustrating one embodiment of a large maneuver strategy.
Figure 3C:
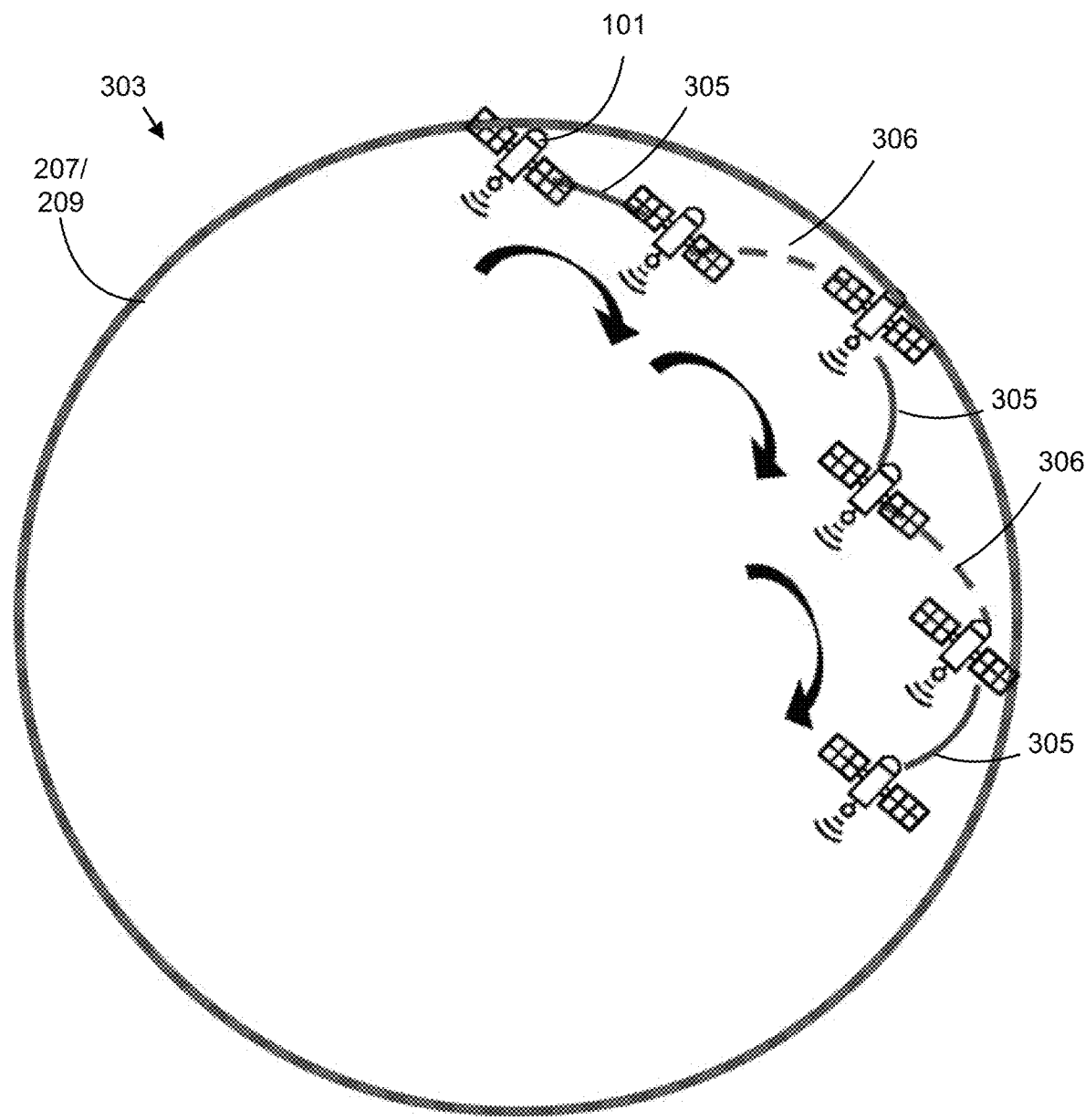
FIG. 3C is a drawing illustrating one embodiment of a small maneuver strategy.

The maneuver strategy 215 is described in FIGS. 3B-C. The switching strategy 223 and drift horizon 225 are described in FIG. 3D.

FIG. 3A is a drawing illustrating one embodiment of the outer polytope boundary 207 and the inner polytope boundaries 209. The outer polytope boundary 207 and the inner polytope boundaries 209 are employed to maintain a position of a spacecraft 101 relative to the virtual point 111. By individually maintaining the position of each spacecraft 101 relative to the virtual point 111, the positions of all spacecraft 101 within the spacecraft formation 109 are maintained. In one embodiment, no outer polytope boundaries 207 of the plurality of spacecraft 101 overlap.

FIG. 3B is a drawing illustrating one embodiment of a large maneuver strategy 301 maneuver strategy 215. As shown, a spacecraft 101 has drifted 306 outside of the inner polytope boundary 209 and may exit the outer polytope boundary 207. In the depicted maneuver strategy 215, fewer maneuvers 305 are used to control a spacecraft 101 to within and/or to the center of the outer polytope boundary 207 and/or inner polytope boundary 209. The large maneuver strategy 301 may comprise no more than a maneuver threshold of maneuvers 305 to move the spacecraft 101 within the outer polytope boundary 207 and/or inner polytope boundary 209. The maneuver threshold may be in the range of 2 to 20 maneuvers 305.

FIG. 3C is a drawing illustrating one embodiment of a small maneuver strategy 303 maneuver strategy 215. The spacecraft 101 is shown drifting 306 to exit the outer polytope boundary 207. In the depicted embodiment, the outer polytope boundary 207 and the inner polytope boundary 209 have a same radius. For the small maneuver strategy 303 maneuver strategy 215, more maneuvers 305 are used to control a spacecraft 101 within the outer polytope boundary 207 and/or inner polytope boundary 209. The small maneuver strategy 303 may comprise at least the maneuver threshold of maneuvers 305 to move the spacecraft 101 within the inner polytope boundary 209.

The embodiments may employ the large maneuver strategy 301 and the small maneuver strategy 303 to minimize fuel usage. The large maneuver strategy 301 periodically uses large maneuvers 305 to drive the position and velocity error to near zero. The small maneuver strategy 303 uses many small maneuvers 305 to stay just inside the boundary of the outer polytope boundary 207 and/or inner polytope boundary 209.

Figure 3D:
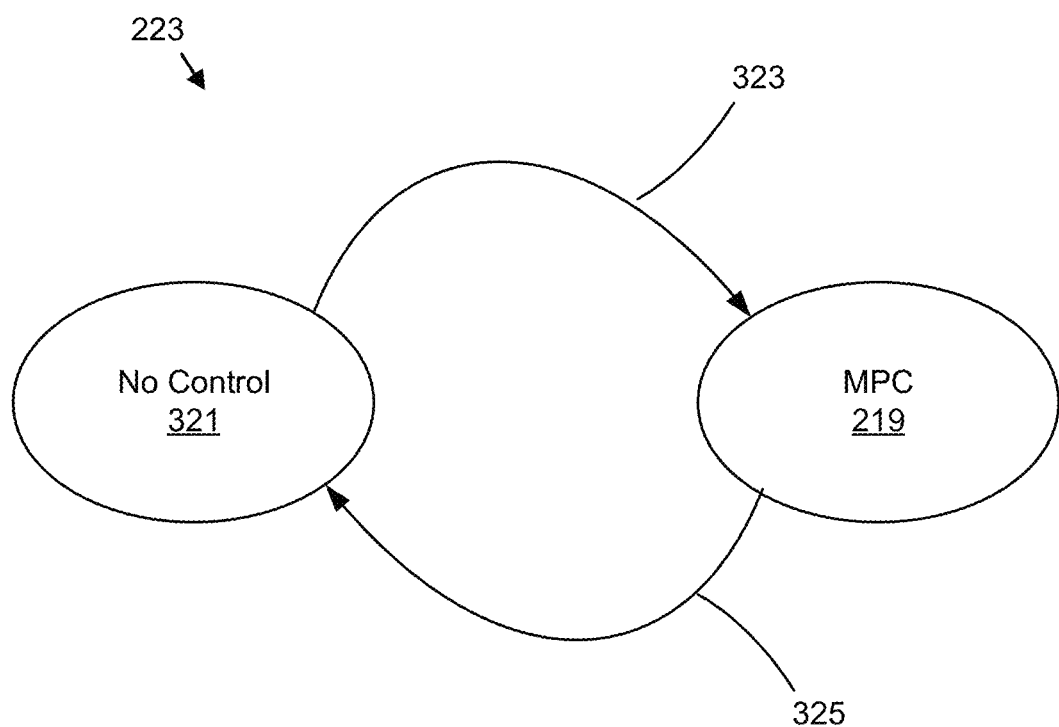
FIG. 3D is a drawing illustrating one embodiment of a switching strategy.

FIG. 3D is a drawing illustrating one embodiment of the switching strategy 223. The switching strategy 223 may determine when to employ the MPC 219 and when to allow the spacecraft 101 to coast or drift. The switching conditions 323/325 may be the outer polytope boundary 207 and/or the inner polytope boundary 209. Either the outer polytope boundary 207 and/or inner polytope boundary 209 may be a keep-in-boundary. In one embodiment, if a maneuver switching condiction 323 determines that the spacecraft 101 will leave the keep-in-boundary then the MPC 219 is activated. If a drift switching condition 325 determines that the spacecraft 101 will remain withing the keep-in-boundary, the MPC 219 is deactivated and no control 321 is employed. In the embodiment of FIG. 3C, the inner polytope boundary 209 is set to have the same radius as the outer polytope boundary 207. This causes the MPC 219 to only be on long enough to keep the spacecraft 101 just inside the outer polytope boundary 207. The outer polytope boundary 207 and the inner polytope boundary 209 are depicted in FIGS. 3A-C. The inner polytope boundary 209 may be used in the design of the weighting matrix Q. This may encourage the spacecraft 101 to stay in the inner polytope boundary 209.

To determine if the spacecraft 101 will exit a polytope boundary 207/209, the drift horizon $N_{drift}$ 225 is used. The spacecraft state x 203 is propagated using the discrete form of the HCW equations orbital data 221 as Equation 22.

$$\hat{x}_{k+1} = A_D \hat{x}_k \; k=0,, N_{drift}-1 \tag{22}$$

where $x_0$ is the current state 203 of the spacecraft 101 and $\hat{x}_k$ are the projected drift states 203 of the spacecraft 101. Since this propagation is used to determine the behavior of the spacecraft 101 once the controls are turned off, no control inputs are used.

The maneuver strategy 215 determines whether to turn the MPC 219 on or off. In addition to the polytope boundaries 207/209, a velocity check is used to compare the velocity of the spacecraft 101 at each point along the drift trajectory with the desired trajectory. The velocity cutoff condition is defined as Equation 23.

$$|v-v_d|_2 \le \delta v \tag{23}$$

where v is the current relative velocity, $v_d$ is the desired relative velocity, and $\delta v$ is the allowable relative velocity error. The velocity switching condition may force the spacecraft 101 to better match the desired trajectory without having to drastically tighten the inner polytope boundary 209. If a velocity check is not desired, then $\delta v$ can be set to $\infty$ and is effectively ignored. This is the case for the maneuver strategy 215 of FIG. 3C as the spacecraft 101 is far from the desired state. When drifting, if any drift state is found to be outside the outer polytope boundary 207, the MPC 219 turns on. The MPC 219 may remain on until all the drift states are found to be within the inner polytope boundary 209 and the velocity check is met.

In one embodiment, the maneuver switching condiction 323 is satisfied if Equation 24 and/or Equation 25 are satisfied.

$$A'_{poly,k} \hat{x} \le b'_{poly,k} \forall k \in \{0, 1, \ldots, N_{drift}\} \tag{24}$$

$$|v_k - v_d|_2 \le \delta v \forall k \in \{0, 1, \ldots, N_{drift}\} \tag{25}$$

In one embodiment, the MPC 219 is deactivated if the drift switching condiction 325 is satisfied. The drift switching condiction 325 may be satisfied in response to Equation 26 being satisfied.

$$\exists k s \cdot t \cdot A_{poly,k} \hat{x} \le b_{poly,k} \forall k \in \{0, 1, \ldots, N_{drift}\} \tag{26}$$

Figure 4:
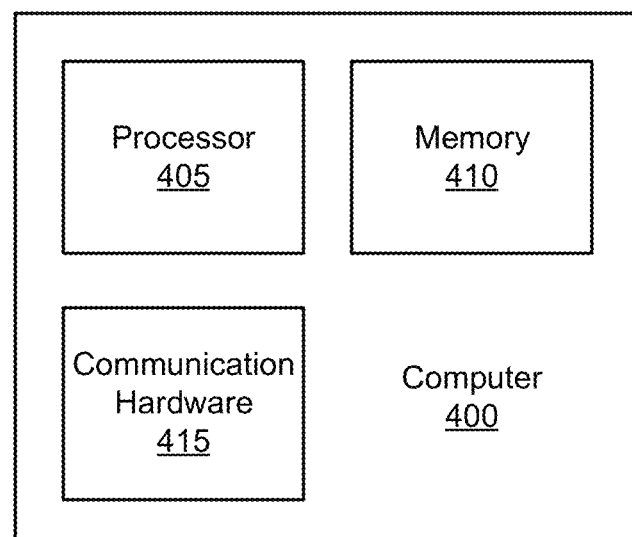
FIG. 4 is a schematic block diagram illustrating one embodiment of a computer.

FIG. 4 is a schematic block diagram illustrating one embodiment of a computer 400. The computer 400 may be embodied in a spacecraft 101 and/or ground station 103. In the depicted embodiment, the computer 400 includes a processor 405, a memory 410, and communication hardware 415. The memory 410 may store code and data. The processor 405 may execute the code and process the data. The communication hardware 415 may communicate with other devices such as spacecraft 101 and ground stations 103.

Figure 5:
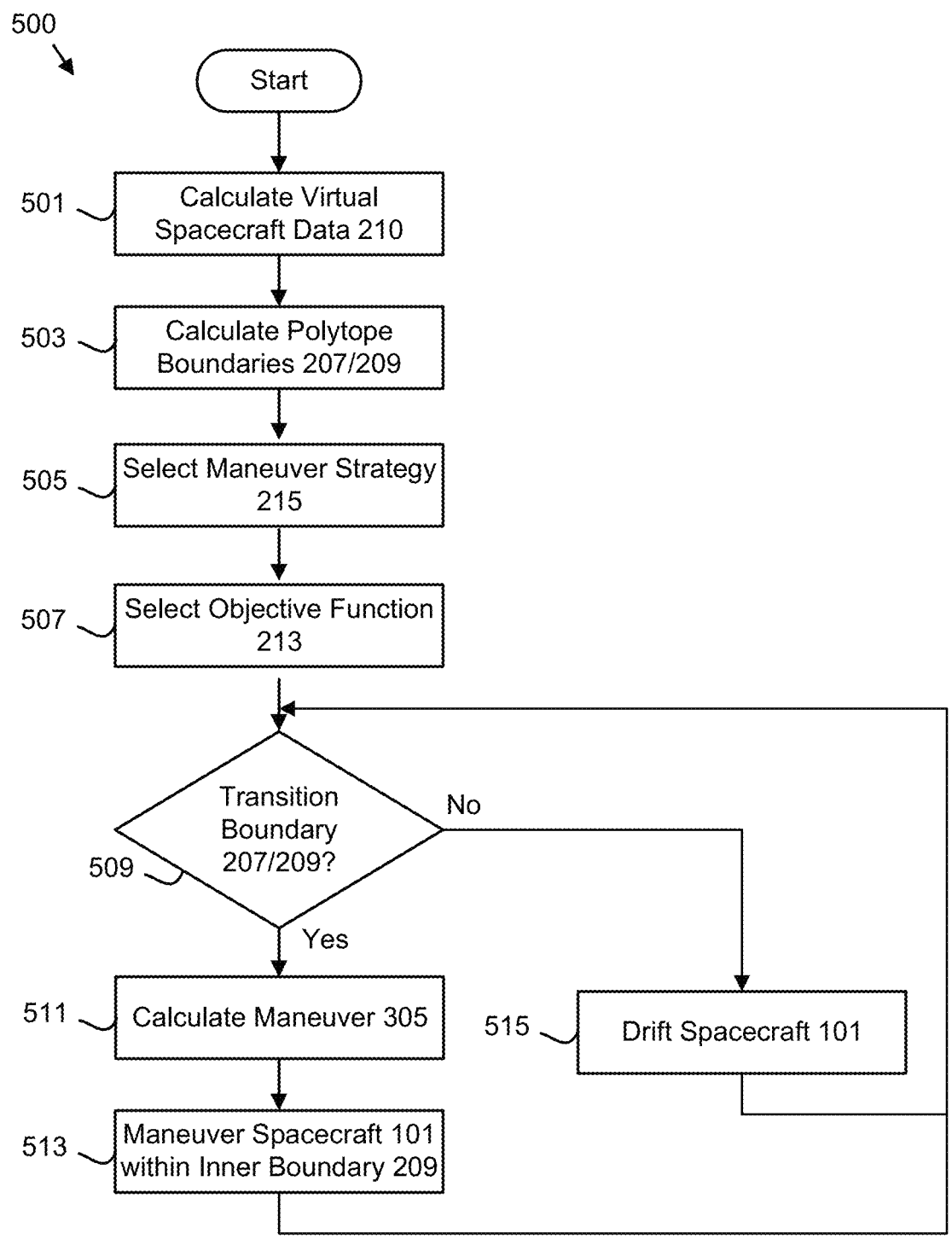
FIG. 5 is a schematic flow chart diagram illustrating one embodiment of a spacecraft control method.

FIG. 5 is a schematic flow chart diagram illustrating one embodiment of a spacecraft control method 500. The method 500 may maneuver the spacecraft 101 within a spacecraft formation 109. The method 500 may be performed by the computer 400 and/or processor 405.

The method 500 starts, and in one embodiment, the processor 405 calculates 501 the virtual spacecraft data 210 for a virtual point 111. The virtual point 111 may represent a plurality of spacecraft 101 orbiting in a spacecraft formation 109.

The processor 405 may calculate 503 the outer polytope boundary 207 and the inner polytope boundary 209 relative to the virtual point 111 for a given spacecraft 101. The outer polytope boundary 207 and the inner polytope boundary 209 may have a common center. The outer polytope boundary 207 and the inner polytope boundary 209 may be calculated 503 to maintain the distance threshold 205 between the given spacecraft 101 and the virtual point 111. The outer polytope boundary 207 and the inner polytope boundary 209 may be calculated 503 to maintain a vector of the distance threshold 205 between the given spacecraft 101 and the virtual point 111.

The processor 405 may select 505 a maneuver strategy 215. The maneuver strategy 215 may be selected 505 from the group consisting of the large maneuver strategy 301 and the small maneuver strategy 303. The maneuver strategy 215 may be selected based on forecast maneuvers 305.

The processor 405 may select 507 an objective function 213. The selected objective function 213 may minimize fuel consumption. In one embodiment, the selected objective function 213 minimizes velocity change 217.

The processor 405 determines 509 whether the given spacecraft 101 will exit the outer polytope boundary 207 or enter the inner polytope boundary 209. In a certain embodiment, the processor 405 determines 509 whether the given spacecraft 101 will exit the outer polytope boundary 207. In one embodiment, the given spacecraft 101 is determined 507 to exit the outer polytope boundary 207 or the inner polytope boundary 209 if the given spacecraft will exit the outer polytope boundary 207 or the inner polytope boundary 209 within a specified time interval such as 5 to 60 minutes. In a certain embodiment, the given spacecraft 101 is determined 507 to enter the inner polytope boundary 209 if the given spacecraft will enter the inner polytope boundary 209 within the specified time interval.

If the processor 405 determines 509 that the given spacecraft 101 will not exit the outer polytope boundary 207 or the inner polytope boundary 209, the processor 405 allows the given spacecraft 101 to drift 515. The processor 405 may drift 515 the spacecraft 101 by taking no action. The processor 405 will further loop to determine 509 whether the given spacecraft 101 will exit the outer polytope boundary 207 or the inner polytope boundary 209.

If the processor 405 determines 509 that the given spacecraft 101 will exit the outer polytope boundary 207 or the inner polytope boundary 209, the processor 405 may calculate 511 a maneuver 305 for the given spacecraft 101 using the MPC 219. The calculation 511 may be relative to the virtual point 111. The calculation 511 of the maneuver 305 for each spacecraft 101 of the spacecraft formation 109 may be performed independently.

The processor 405 further maneuvers 513 the given spacecraft 101 to within the inner polytope boundary 209 using the MPC 219 and the method 500 ends. The given spacecraft 101 may be maneuvered 513 using the selected maneuver strategy 215 and/or calculated maneuver 305. The processor 405 may activate thrusters to maneuver 513 the spacecraft 101.

The embodiments employ the virtual point 111, the outer polytope boundary 207, and the inner polytope boundary 209 to simplify calculating maneuvers 305 to maintain each spacecraft 101 at a desired position within the spacecraft formation 109. As a result, the efficiency and effectiveness of the computer 400 is improved.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
calculating, by use of a processor, a virtual point that represents a plurality of spacecraft orbiting in a spacecraft formation;
calculating an outer polytope boundary and an inner polytope boundary relative to the virtual point for a given spacecraft of the plurality of spacecraft; and
maneuvering the given spacecraft to within the inner polytope boundary using model predictive control (MPC) to minimize fuel consumption.

2. The method of claim 1, the method further comprising drifting the given spacecraft in response to the given spacecraft being within the inner polytope boundary.

3. The method of claim 1, the method further comprising drifting the given spacecraft in response to the given spacecraft being within the outer polytope boundary.

4. The method of claim 1, the method further comprising selecting an objective function for the MPC from the group consisting of a first objective function $L_1$, a second objective function $L_2$, and a third objective function $L_\infty$.

5. The method of claim 1, the method further comprising selecting a maneuver strategy from the group consisting of large maneuver strategy and a small maneuver strategy.

6. The method of claim 5, wherein the large maneuver strategy comprises no more than a maneuver threshold of maneuvers and the small maneuver strategy comprises at least the maneuver threshold of maneuvers.

7. The method of claim 1, wherein the given spacecraft is maneuvered in response to exiting the outer polytope boundary.

8. The method of claim 1, wherein the given spacecraft is maneuvered in response to exiting the inner polytope boundary.

9. The method of claim 1, wherein the outer polytope boundary and the inner polytope boundary comprise a plurality of M faces.

10. The method of claim 1, wherein virtual spacecraft data for the virtual point comprises an orbit of the virtual point linearized by Hill-Chohessey-Whiltshire (HCW) equations.

11. An apparatus comprising:
a processor executing code stored on a memory to perform:
calculating a virtual point that represents a plurality of spacecraft orbiting in a spacecraft formation;
calculating an outer polytope boundary and an inner polytope boundary relative to the virtual point for a given spacecraft of the plurality of spacecraft; and
maneuvering the given spacecraft to within the inner polytope boundary using model predictive control (MPC) to minimize fuel consumption.

12. The apparatus of claim 11, the processor further drifting the given spacecraft in response to the given spacecraft being within the inner polytope boundary.

13. The apparatus of claim 11, the processor further drifting the given spacecraft in response to the given spacecraft being within the outer polytope boundary.

14. The apparatus of claim 11, the processor further selecting an objective function for the MPC from the group consisting of a first objective function $L_1$, a second objective function $L_2$, and a third objective function $L_\infty$.

15. The apparatus of claim 11, the processor further selecting a maneuver strategy from the group consisting of large maneuver strategy and a small maneuver strategy.

16. A computer program product comprising a non-transitory computer readable storage medium storing code executable by a processor to perform:
   calculating a virtual point that represents a plurality of spacecraft orbiting in a spacecraft formation;
   calculating an outer polytope boundary and an inner polytope boundary relative to the virtual point for a given spacecraft of the plurality of spacecraft; and
   maneuvering the given spacecraft to within the inner polytope boundary using model predictive control (MPC) to minimize fuel consumption.

17. The computer program product of claim 16, the processor further drifting the given spacecraft in response to the given spacecraft being within the inner polytope boundary.

18. The computer program product of claim 16, the processor further drifting the given spacecraft in response to the given spacecraft being within the outer polytope boundary.

19. The computer program product of claim 16, the processor further selecting an objective function for the MPC from the group consisting of a first objective function $L_1$, a second objective function $L_2$, and a third objective function $L_\infty$.

20. The computer program product of claim 16, the processor further selecting a maneuver strategy from the group consisting of large maneuver strategy and a small maneuver strategy.

\* \* \* \* \*